United States Patent [19]

Strack

[11] 4,339,417

[45] Jul. 13, 1982

[54] PROCESS FOR THE PRODUCTION OF CRYSTALLINE ZEOLITE A

[75] Inventor: Hans Strack, Alzenau, Fed. Rep. of Germany

[73] Assignee: Degussa AG, Frankfurt, Fed. Rep. of Germany

[21] Appl. No.: 237,726

[22] Filed: Feb. 24, 1981

[30] Foreign Application Priority Data

Feb. 26, 1980 [DE]   Fed. Rep. of Germany ....... 3007044

[51] Int. Cl.³ ............................................. C01B 33/28
[52] U.S. Cl. .................................... 423/329; 423/328
[58] Field of Search ........................ 423/328, 329, 330

[56] References Cited

U.S. PATENT DOCUMENTS

| | | |
|---|---|---|
| 4,071,377 | 1/1978 | Schwuger et al. ............. 423/329 X |
| 4,073,867 | 2/1978 | Roebke et al. ...................... 423/329 |
| 4,222,995 | 9/1980 | Roebke et al. ...................... 423/329 |
| 4,248,847 | 2/1981 | Derleth et al. ...................... 423/329 |
| 4,271,135 | 6/1981 | Wuest et al. ................... 423/328 X |
| 4,303,626 | 12/1981 | Strack et al. ......................... 423/329 |
| 4,303,627 | 12/1981 | Strack et al. ......................... 423/329 |
| 4,303,628 | 12/1981 | Strack et al. ......................... 423/329 |
| 4,305,916 | 12/1981 | Strack et al. ......................... 423/329 |

*Primary Examiner*—Edward J. Meros
*Attorney, Agent, or Firm*—Cushman, Darby & Cushman

[57] ABSTRACT

There is produced crystalline zeolite powder of Type A having an average particle diameter of 8.5 to 9.0μ by introducing the components waterglass and alkali aluminate liquor under defined conditions simultaneously into a receiver containing alkali aluminate, stirring, first adding more alkali aluminate liquor and then more waterglass solution. The thus obtained crystalline zeolite powder of Type A is used as a phosphate substitute in washing agents.

8 Claims, No Drawings

PROCESS FOR THE PRODUCTION OF CRYSTALLINE ZEOLITE A

BACKGROUND OF THE INVENTION

The invention is directed to a process for the production of crystalline zeolite powder of Type A.

Zeolite A is a crystalline alkali aluminum silicate and corresponds in its composition to the formula $$1.0\pm0.2\ M_{2/n}O: Al_2O_3:1.85\pm0.5\ SiO_2\cdot y\ H_2O$$

where M is a metal cation, n its valence and y has a value up to 6.

Zeolite A in an increasing measure is important as a substitute for phosphate in washing agents. For this purpose, it is desirable that the crystalline zeolite powder of Type A have the most uniform particle size possible, i.e. as narrow as possible particle size distribution curve.

SUMMARY OF THE INVENTION

The object of the invention is the development of a process for the production of crystalline zeolite powder of Type A having an average particle diameter of 8.5 to 9.0μ which is characterized by adding during a time span of 8 to 15 minutes, 0.5 to 2.5 parts by volume of a sodium aluminate liquor having a concentration of 20 to 120, preferably 30 to 100 g/l of Na₂O and 5 to 50, preferably 10 to 30 g/l of Al₂O₃, which in a given case is diluted with the same volume amount of water simultaneously with stirring at a temperature of 30° to 70° C. with 0.1 to 0.6 parts by volume of a waterglass solution having a concentration of 90 to 120, prefreably 100 to 110 g/l Na₂O and 330 to 380, preferably 340 to 370 g/l of SiO₂, which in a given case is diluted with water to 3 parts by volume, to a receiver containing 8 to 12 parts by volume of a sodium aluminate liquor having a concentration of 50 to 200 g/l Na₂O and 30 to 150 g/l of Al₂O₃, subsequently stirring over a time span of 25 to 45 minutes, adding a further 15 to 20 parts by volume of the same sodium aluminate liquor, as well as subsequently a further 3.0 to 3.5 parts by volume of the same waterglass solution during a time span of 8 to 15 minutes, in a given case stirring the reaction mixture for a further 20 to 180 minutes at a temperature of 75° to 100° C. cooling and filtering off the crystalline reaction product and drying.

The crystalline zeolite powder of Type A obtained according to the process of the invention has an average particle diameter of 8.5 to 9.0μ and can be employed advantageously as a phosphate substitute in washing agents.

The process can comprise, consist essentially of or consist of the steps set forth with the stated materials.

DETAILED DESCRIPTION

Example

There were present in a reaction vessel 10 liters of sodium aluminate liquor having a concentration of 70 g/l Na₂O and 41 g/l Al₂O₃. There were simultaneously added to this liquor at a temperature of 65° C. with stirring 2 liters of sodium aluminate liquor having a concentration of 116 g/l Na₂O and 80 g/l Al₂O₃ and 0.56 liter of waterglass solution having a concentration of 104 g/l Na₂O and 380 g/l SiO₂, which is diluted with 1.44 liters of water, during a time span of 10 minutes. Subsequently, the reaction mixture was stirred for 30 minutes at a temperature of 65° C. Subsequently there were added with stirring 18 liters of sodium aluminate liquor of the same concentration as that previously added and then 3.04 liters of waterglass solution of the same concentration as that previously added within a time span of 10 minutes at a temperature of 65° C. The reaction mixture was subsequently stirred for 40 minutes more at a temperature of 90° C. and subsequently cooled. The crystalline reaction product (zeolite A) was filtered off and dried.

The particle size distribution was determined with a Coulth Counter. There were obtained the following values:

| | |
|---|---|
| <9.0μ | 50 wt.-% |
| <10μ | 27 wt.-% |
| <15μ | 3 wt.-% |

The grit content (particles above 45μ) was 0.064 weight % according to Mocker. The calcium binding capacity was 162 mg CaO/g zeolite A.

The entire disclosure of German priority application No. P 3007044.1 is hereby incorporated by reference.

What is claimed is:

1. A process for the production of a crystalline zeolite powder of Type A having an average particle diameter of 8.5 to 9.0μ, comprising (1) having present in a container 8 to 12 parts by volume of a sodium aluminate liquor having a concentration of 50 to 200 g/l Na₂O and 30 to 150 g/l Al₂O₃, (2) simultaneously adding with stirring during a time span of 8 to 15 minutes at a temperature of 30° to 70° C. either (a) 0.5 to 2.5 parts by volume of a sodium aluminate liquor having a concentration of 20 to 120 g/l Na₂O and 5 to 50 g/l Al₂O₃ or (b) such sodium aluminate liquor diluted with up to the same volume of water and (c) 0.1 to 0.6 parts by volume of a waterglass solution having a concentration of 90 to 120 g/l Na₂O and 330 to 380 g/l SiO₂ or (d) such waterglass solution diluted up to 3 parts by volume with water, (3) subsequently stirring over a time span of 25 to 45 minutes, (4) adding during a time span of 8 to 15 minutes a further 15 to 20 parts by volume of the same sodium aluminate liquor as in step (2) as well as subsequently adding 3.0 to 3.5 parts by volume of the same waterglass solution as in step (2), cooling, filtering off the crystalline reaction product and drying.

2. The process of claim 1 including the step (5) of stirring the reaction mixture after step (4) for 20 to 180 minutes at 75° to 100° C.

3. The process of claim 2 wherein the concentration of the sodium aluminate liquor added in step (2) is 30 to 100 g/l Na₂O and 10 to 30 g/l Al₂O₃, the concentration of waterglass added in step (2) is 110 to 100 g/l Na₂O and 340 to 370 g/l SiO₂.

4. The process according to claim 2 wherein there is originally present in the container 10 liters of the sodium aluminate liquor having a concentration of 70 g/l Na₂O and 41 g/l Al₂O₃, step (2) is carried out at 65° C. for 10 minutes using 2 liters of sodium aluminate liquor having a concentration 116 g/l Na₂O and 80 g/l of Al₂O₃ and 0.56 liters of waterglass solution having a concentration of 104 g/l Na₂O and 380 g/l SiO₂ and diluted with 1.44 liters of water, stirring in step (3) for 30 minutes at 65° C., in step (4) adding 18 liters of the sodium aluminate liquor and then 3.04 liters of the waterglass solution within 10 minutes at 65° C. and carrying out step (5) for 40 minutes at 90° C.

5. The process of claim 4 including the step of recovering a zeolite A powder having a particle size distribution of

| | |
|---|---|
| <9.0μ | 50 wt. % |
| <10μ | 27 wt. % |
| <15μ | 3 wt. % | and a grit content above 45μ of not over 0.064 wt. %.

6. The process of claim 1 consisting essentially of steps (1), (2), (3), and (4) or consisting essentially of steps (1), (2), (3), (4), and step (5) stirring the reaction mixture after step (4) for 20 to 180 minutes at 75° to 100° C.

7. The process of claim 6 consisting of steps (1), (2), (3), and (4).

8. The process of claim 6 consisting of steps (1), (2), (3), (4), and (5).

* * * * *

UNITED STATES PATENT AND TRADEMARK OFFICE
CERTIFICATE OF CORRECTION

PATENT NO.  : 4,339,417
DATED       : July 13, 1982
INVENTOR(S) : STRACK, Hans

It is certified that error appears in the above—identified patent and that said Letters Patent is hereby corrected as shown below:

IN THE COVER SHEET:

Item 73, there should be added:

--Henkel Kommanditgesellschaft auf Aktien (Henkel KGaA)--.

Signed and Sealed this

Twenty-sixth Day of October 1982

[SEAL]

Attest:

Attesting Officer

GERALD J. MOSSINGHOFF

Commissioner of Patents and Trademarks